United States Patent [19]

Parsons

[11] Patent Number: 5,719,334
[45] Date of Patent: Feb. 17, 1998

[54] HERMETICALLY PROTECTED SENSOR ASSEMBLY

[75] Inventor: Mark A. Parsons, Rochester, Mich.

[73] Assignee: Ford Motor Company, Dearborn, Mich.

[21] Appl. No.: 678,263

[22] Filed: Jul. 11, 1996

[51] Int. Cl.⁶ .................................................. G01P 15/00
[52] U.S. Cl. ........................ 73/514.01; 73/514.32
[58] Field of Search ......................... 73/514.12, 514.32, 73/522, 514.01; 361/280, 732; 174/52.2, 52.3, 50.52; 437/219

[56] References Cited

U.S. PATENT DOCUMENTS

| | | | |
|---|---|---|---|
| 3,624,264 | 11/1971 | Lazarus | 84/1.14 |
| 4,618,467 | 10/1986 | Burger et al. | 264/46.6 |
| 4,658,651 | 4/1987 | Le | 73/708 |
| 4,686,764 | 8/1987 | Adams et al. | 29/592 |
| 4,713,573 | 12/1987 | Gansert et al. | 310/329 |
| 4,893,215 | 1/1990 | Urushiwara et al. | 361/395 |
| 5,036,705 | 8/1991 | Gaines | 73/517 AV |
| 5,049,972 | 9/1991 | Uda et al. | 357/68 |
| 5,144,745 | 9/1992 | Yoshimura et al. | 29/602.1 |
| 5,233,871 | 8/1993 | Schwarz et al. | 73/493 |
| 5,233,872 | 8/1993 | Kushida et al. | 73/497 |
| 5,233,873 | 8/1993 | Mozgowiec et al. | 73/497 |
| 5,253,526 | 10/1993 | Omura et al. | 73/514.32 |
| 5,343,064 | 8/1994 | Spangler et al. | 257/350 |
| 5,351,542 | 10/1994 | Ichimura et al. | 73/517 R |
| 5,410,915 | 5/1995 | Yamamoto | 73/514.32 |
| 5,532,187 | 7/1996 | Schreiber-Prillwitz et al. | 437/182 |
| 5,567,878 | 10/1996 | Kobayashi | 73/514.12 |

*Primary Examiner*—Hezron E. Williams
*Assistant Examiner*—Richard A. Moller
*Attorney, Agent, or Firm*—Joseph W. Malleck

[57] ABSTRACT

A hermetically protected electronic assembly that has (a) a housing having walls defining a shallow impervious cavity with a depth no greater than 6-12 mm and with an cavity bottom surface; (b) conductor pins extending through integrally said housing walls and along the cavity bottom surface; (c) an insulating supporting platform resting on the cavity bottom surface with ends of the conductor pins extending therethrough to secure the position of the platform, the platform carrying an electrical circuit integrated to at least the top surface of the platform and connected to the conductor pins; (d) at least one electronic sensor component supported in the housing by the platform and operatively secured to the circuit; and (e) a waterproofing silicon gel filling the entire space within the housing including surrounding the circuit, platform, sensor and pin connections therein.

7 Claims, 2 Drawing Sheets

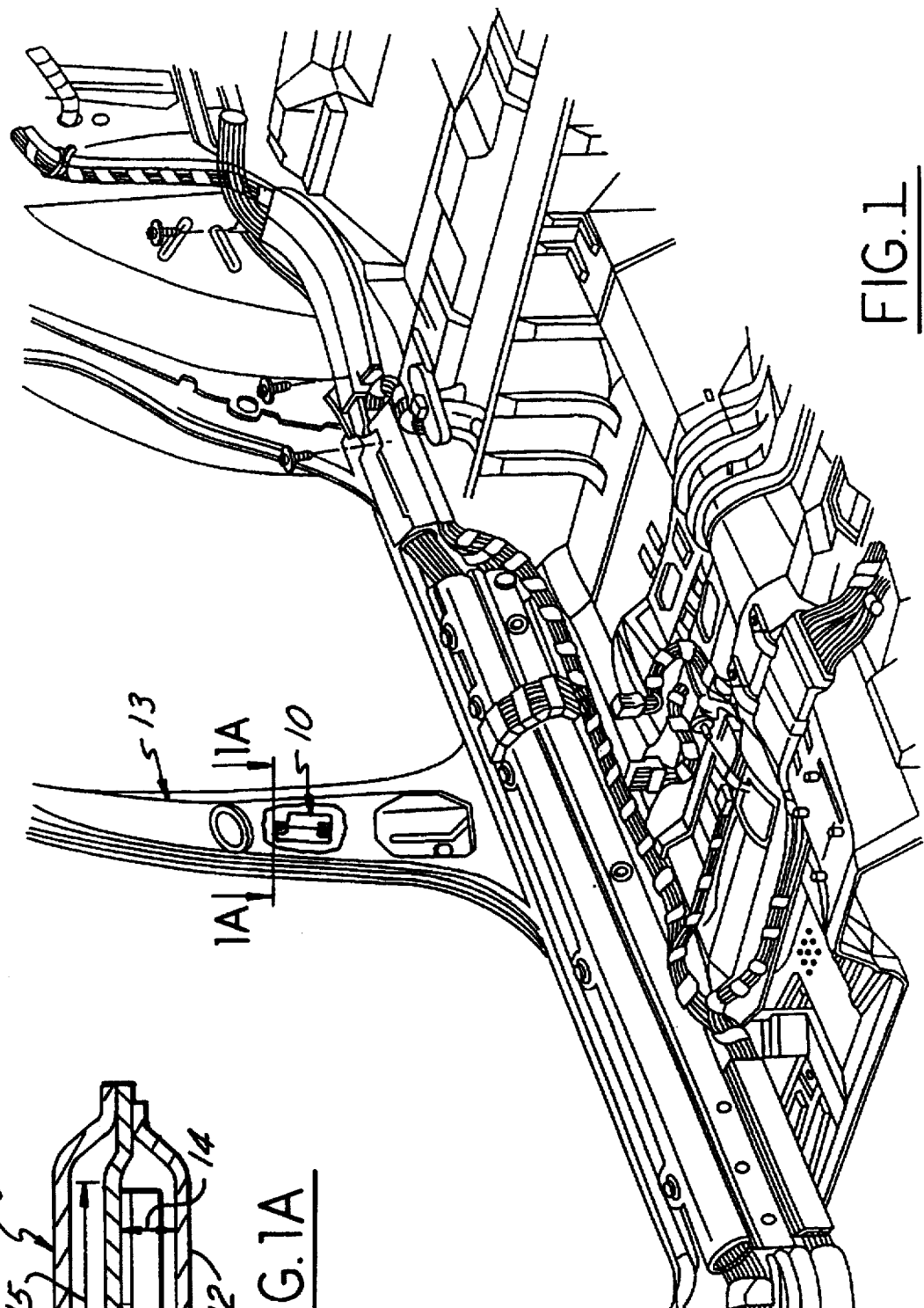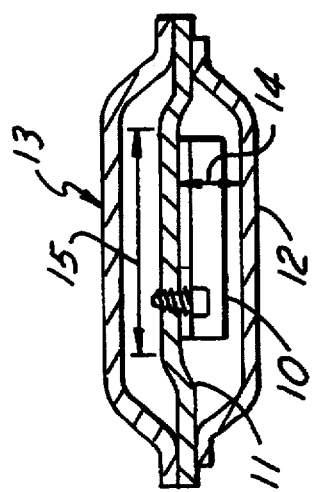

HERMETICALLY PROTECTED SENSOR ASSEMBLY

BACKGROUND OF THE INVENTION

1. Technical Field

This invention relates to packaging technology for sensor assemblies and more particularly to protective sealing for accelerometer sensors such as that used in automotive safety airbag applications.

2. Discussion of the Prior Art

Packaging used for sensor assemblies in automotive applications is subject to constraints not found in other applications, the constraints include space limitations, isolation of interfering thermal expansion, and protection against contamination and physical damage. Less and less space is being made available for receiving such sensor assemblies, such as in automotive doors or in the B-pillar of an auto body, each having a reduced thickness or envelope. Space thickness of several inches was acceptable in the past, but space thickness of one or two centimeters is now available for fitting the sensor assembly therein. The assemblies in the past have used a metal or plastic housing with an electrical platform spaced from the housing walls to accommodate suspending devices that promote a damping and thereby isolation of the sensor to the intended forces to be sensed. This of course requires more space. To protect against contamination and physical damage, it has been conventional to (i) apply special sealants or gaskets between the housing and any housing cover, and (ii) to use conformal coatings or sealing on some portion of the electronic circuitry or terminals. Sealants have included hardened foam, and silicone or silastic fluorosilicone. These prior art efforts have proven to be more costly and do not meet the more restrictive space limitation in modern vehicle applications.

SUMMARY OF THE INVENTION

It is an object of this invention to provide a hermetically sealed electronic sensor assembly that allows for the design of a much thinner silhouette for the assembly while economically reducing the complexity of isolating against thermal expansion interference and promoting protection against contamination and physical damage.

The invention herein that meets such object is a hermetically protected electronic assembly that comprises; (a) a housing having walls defining a shallow impervious cavity with a depth no greater than 6–12 mm. and with an cavity bottom surface; (b) conductor pins extending integrally through said housing walls and along the cavity bottom surface; (c) an insulating supporting platform resting on the cavity bottom surface with ends of the conductor pins extending therethrough to secure the position of the platform, the platform carrying an electrical circuit integrated to at least the top surface of the platform and connected to the conductor pins; (d) at least one electronic sensor component supported in the housing by the platform and operatively secured to the circuit; and (e) a water proofing silicon gel filling the entire space within the housing including surrounding the circuit, platform, sensor and pin connector therein.

BRIEF DESCRIPTION OF THE DRAWINGS

FIG. 1 is a schematic illustration of a portion of an automotive vehicle body construction deploying the sensor assembly of this invention;

FIG. 1A is a sectional view taken along line 1A—1A of FIG. 1.

DETAILED DESCRIPTION AND BEST MODE

Figure 2:
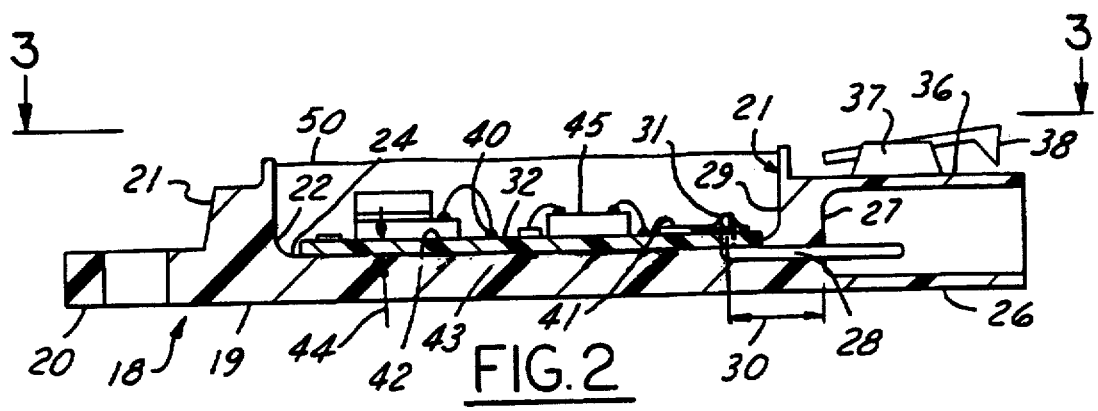
FIG. 2 is a enlarged cross-sectional elevation view of the sensor assembly, embodying the principles of this invention.

As shown in FIG. 1, the sensor assembly 10 must fit within a confined space 11 defined by the exposed panel 12 and a generally vertically disposed B-pillar 13 of an autobody frame. The distance 14 between the cover 12 and pillar 13 is often defined to be within the range of 15–22 mm, while the transverse distance 15 between opposite sides 16, 17 of the pillar receptacle is about 36 mm.

Figure 3:
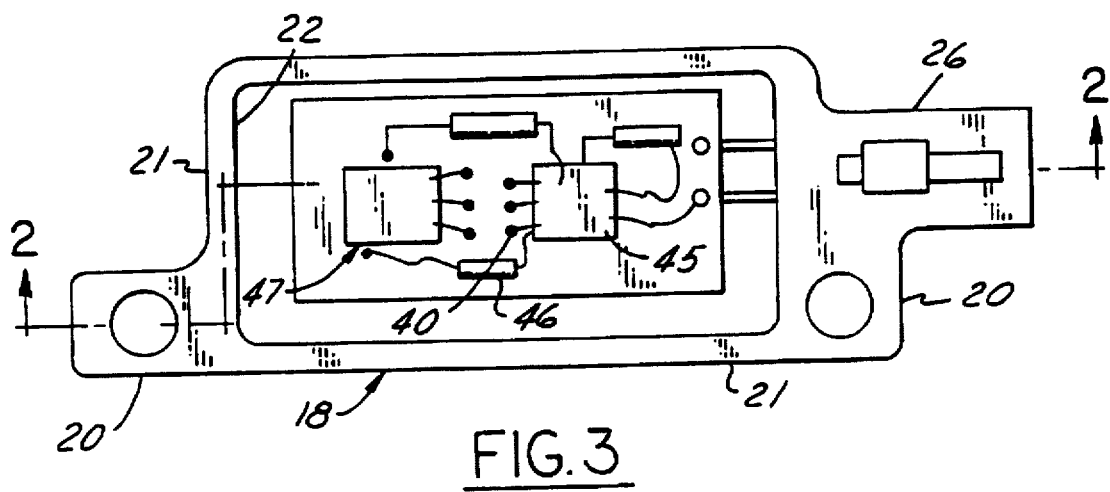
FIG. 3 is a side elevational view of the structure shown in FIG. 2, taken substantially along line 3—3 thereof.
Figure 4:
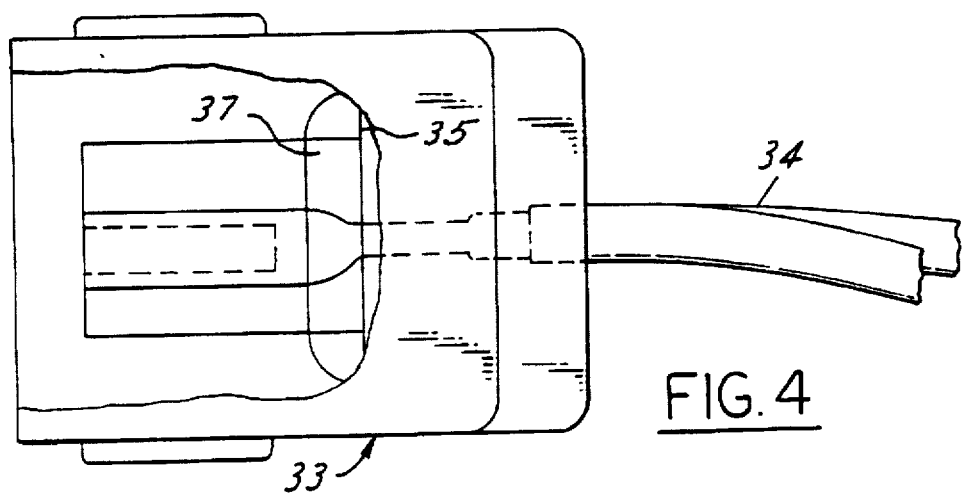
FIG. 4 is a plan view of the structure of FIG. 2, taken substantially along line 4—4 thereof.

As shown in FIGS. 2–4, the main housing 18 of the assembly has a flat base 19 fitted flush against the pillar and has mounting flanges 20 which are mechanically secured to such pillar 13 by suitable fasteners to ensure rigidity of the housing. The main housing has shallow peripheral walls 21 defining an interior cavity 22 which is shallow and has a depth (which is generally uniform across the entire span of the housing) of about 5 mm, and is no greater than 6 mm. The cavity has a general flat bottom interior surface 24. An integral connector housing 26 extends from one side 27 of the main housing 18. The housing 18 and connector housing 26 are molded of a plastic such as polybutylene terephthalate (PBT). During the molding process, a pair of conductive pins 28 are molded integrally through wall 29 and extend generally parallel to the bottom surface 24 a distance 30. At location 31, the pins turn upwardly to receive and extend through an electronic support platform 32. An independent wiring harness connector 33 matingly fits into a socket 39 of housing 26 to electrically connect a wiring harness 34 to the pins 28 by way of such connector at 33. The connector has a lip 35 which slides over the top 36 of the connector housing 26 and has a rib 37 that forces finger 38 to spring upwardly and snap beyond the rib to clamp the connector lip as it is moved past the finger 38.

The electrically insulating supporting platform or circuit board 32 (comprised of ceramic or fiberglass filled polyethylene or the like) has an integrated printed circuit 41 on the upper surface 42 thereof, and is placed with its bottom surface 43 flush onto the bottom surface 24 of the housing cavity. The support platform 32 or board has a thickness 44 of about 1.0 mm and is secured in position by electrically soldering the spaced upwardly turned ends 31 of the connector pins 28. There is little or no space beneath the platform and the bottom surface 24. Terminal pads 40 and resistor 46 of the integrated circuit are formed at the locations as illustrated and are deposited by silk screening to ensure the height of the circuit is restricted to about 3 mm. Circuit components 45 are attached and connected on the platform using advanced surface-mount and chip-on-board technologies; terminals of the chips are connected to the circuit pattern by smaller diameter aluminum wires 46 bonded to terminals and to the circuit paths.

The accelerometer 47 is attached to the platform and may include a silicon mass moveable in an encapsulated body relative to an integral conductive plate to provide variable capacitance in response to acceleration of the body; Capacitive sensor means is formed in the silicon body to be responsive to deflection of the mass and thereby provide an electrical signal corresponding to acceleration. The assembly incorporating such accelerometer is useful in providing an electrical output signal at 0.2 fF/g corresponding to vehicle acceleration or deceleration and thereby regulate operation of an automotive safety bag system on occurrence of a vehicle accident.

To complete the assembly, a waterproofing gel 50 is deposited in a flowable form into the housing cavity 22 to fill the space therein, including that surrounding the circuit, platform, sensor and pin connector therein. The gel is a silicon dielectric rib to clamp the connector lip as it is moved past the finger 38.

The electrically insulating supporting platform or circuit board 32 (comprised of ceramic or fiberglass filled polyethylene or the like) has an integrated printed circuit 41 on the upper surface 42 thereof, and is placed with its bottom surface 43 flush onto the bottom surface 24 of the housing cavity. The support platform 32 or board has a thickness 44 of about 1.0 mm and is secured in position by electrically soldering the spaced upwardly turned ends 31 of the connector pins 28. There is little or no space beneath the platform and the bottom surface 24. Terminal pads 40 and resistor 46 of the integrated circuit are formed at the locations as illustrated and are deposited by silk screening to ensure the height of the circuit is restricted to about 3 mm. Circuit components 45 are attached and connected on the platform using advanced surface-mount and chip-on-board technologies; terminals of the chips are connected to the circuit pattern by smaller diameter aluminum wires 46 bonded to terminals and to the circuit paths.

The accelerometer 47 is attached to the platform and may include a silicon mass moveable in an encapsulated body relative to an integral conductive plate to provide variable capacitance in response to acceleration of the body; Capacitive sensor means is formed in the silicon body to be responsive to deflection of the mass and thereby provide an electrical signal corresponding to acceleration. The assembly incorporating such accelerometer is useful in providing an electrical output signal at 0.2 fF/g corresponding to vehicle acceleration or deceleration and thereby regulate operation of an automotive safety bag system on occurrence of a vehicle accident.

To complete the assembly, a waterproofing gel 50 is deposited in a flowable form into the housing cavity 22 to fill the space therein, including that surrounding the circuit, platform, sensor and pin connector therein. The gel is a silicon dielectric having a viscosity of about 50 cps at 22° C., and sets up when exposed to an acceptable temperature curing profile to be non-flowable. An example of such silicon dielectric is Dow Corning SLYGARD-527 or other equivalent which remains stable as a gel in the temperature range of −40° to 85° C. The gel creates a hermetic seal of the entire assembly in a thin space or silhouette without necessarily the need for a cover, although one can be used that is comparatively thin. The gel eliminates the need for complex gasketing, housing and cover sealants, or connector sealants and special conforming coatings.

While particular embodiments of the invention have been illustrated and described, it will be obvious to those skilled in the art that various changes and modifications may be without departing from the invention, and it is intended to cover in the appended claims all such modifications and equivalents as fall within the true spirit and scope of this invention.

I claim:

1. A hermetically protected electronic assembly comprising;

(a) a housing having walls defining a shallow impervious cavity with a depth no greater than 12 mm and with a generally flat cavity bottom surface;

(b) conductor pins extending integrally through said housing walls and along the cavity bottom surface;

(c) an insulating supporting platform resting on said cavity bottom surface with the ends of the conductor pins extending therethrough to secure the position of the platform, said platform carrying an electrical circuit integrated to at least the top surface of the platform and connected to said conductor pins;

(d) at least one accelerometer component supported in said housing by said platform and operatively secured to said circuit to avoid thermal expansion interference; and (e) a waterproofing silicon gel filling the entire space within said housing including immersing said circuit, platform, accelerometer and pin connectors without affecting their function.

2. The electronic assembly as in claim 1, in which the depth of said housing is uniform across the entire span of the housing.

3. The electronic assembly as in claim 1, in which said electrical circuit is deposited by silk screening thereon to a thickness of 0.2 mm, the height of said component of said electrical circuit being no greater than 3 mm, and the thickness of said platform is no greater than 1.0 mm.

4. The electronic assembly as in claim 1, in which said housing is constituted of plastic and has an integral connector socket and clamp extending from the side of said housing within the height of said housing.

5. The electronic assembly as in claim 1, in which said sensor is an accelerometer effective to sense displacement of a body in response to capacitive effects, said accelerometer having a silicon mass moveable in an encapsulated body resting on said platform with a height of no greater than 3 mm.

6. The electronic assembly as in claim 1, in which said gel is a silicon dielectric and remains as a gel in the temperature range −40° to +85° C.

7. The electronic assembly as in claim 1, in which said assembly is adapted for use as an automotive airbag acceleration sensing assembly mounted within the cross-sectional confines of the B-pillar of an automotive body construction.

* * * * *